Sept. 5, 1944.    G. STUHLFAUTH    2,357,615
MACHINING APPARATUS
Filed July 10, 1940    13 Sheets-Sheet 1

INVENTOR.
George Stuhlfauth
BY Emery Robinson
ATTORNEY.

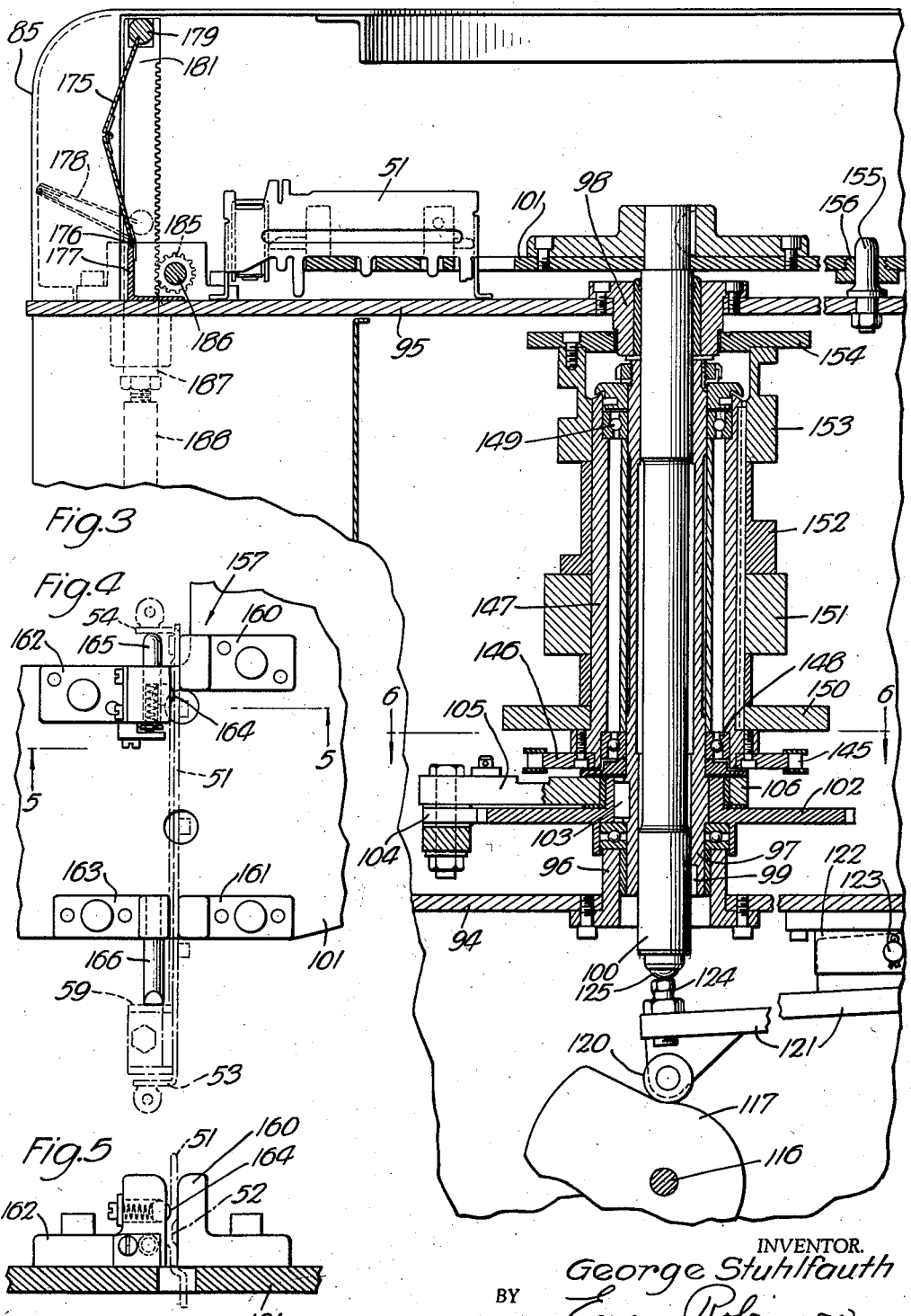

Sept. 5, 1944.　　G. STUHLFAUTH　　2,357,615
MACHINING APPARATUS
Filed July 10, 1940　　13 Sheets-Sheet 3

INVENTOR.
George Stuhlfauth
BY
Emery Robinson
ATTORNEY.

Sept. 5, 1944. G. STUHLFAUTH 2,357,615
MACHINING APPARATUS
Filed July 10, 1940 13 Sheets-Sheet 4
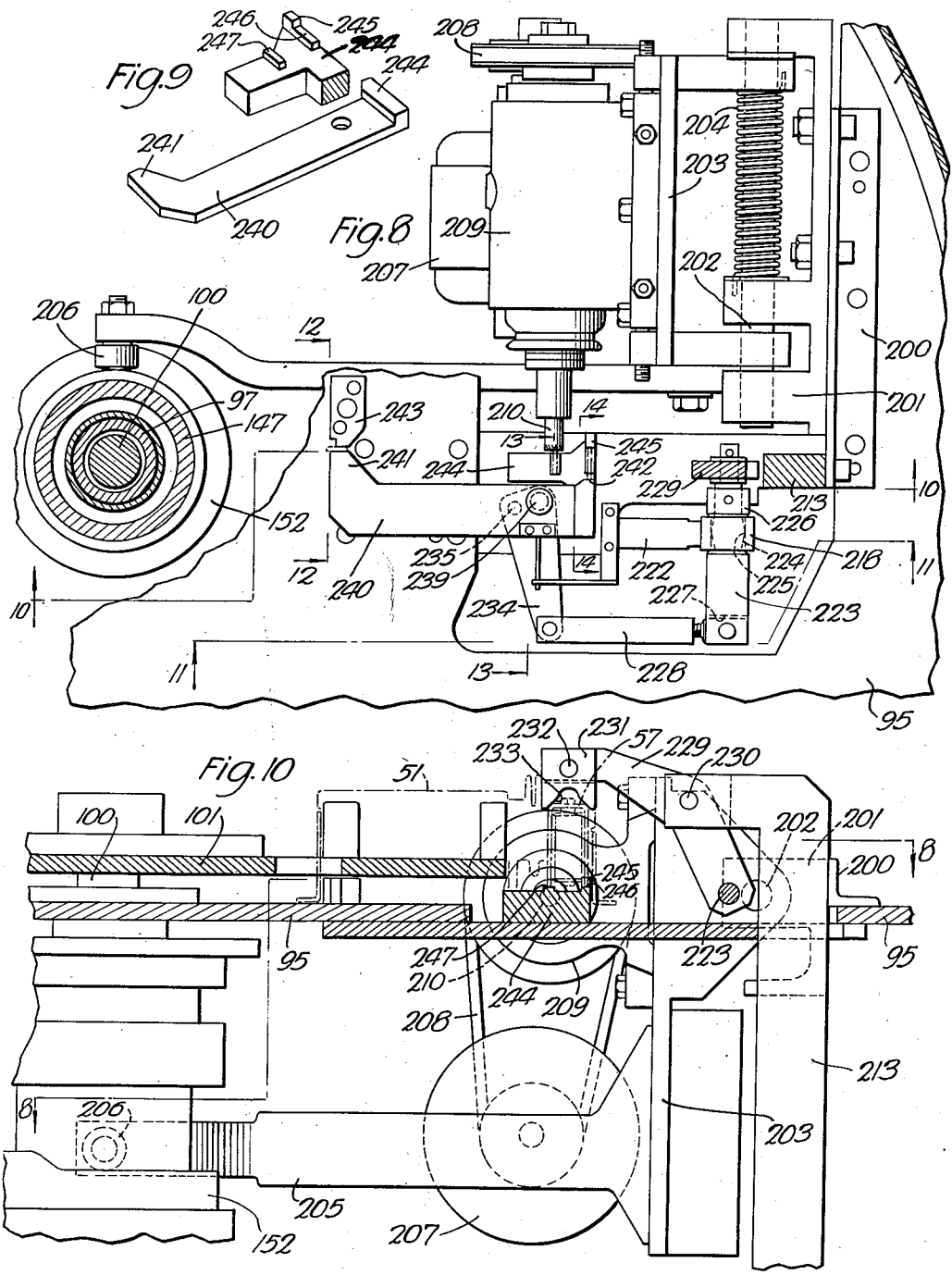
INVENTOR.
George Stuhlfauth
BY Emery Robinson.
ATTORNEY.

Sept. 5, 1944.    G. STUHLFAUTH    2,357,615
MACHINING APPARATUS
Filed July 10, 1940    13 Sheets-Sheet 5
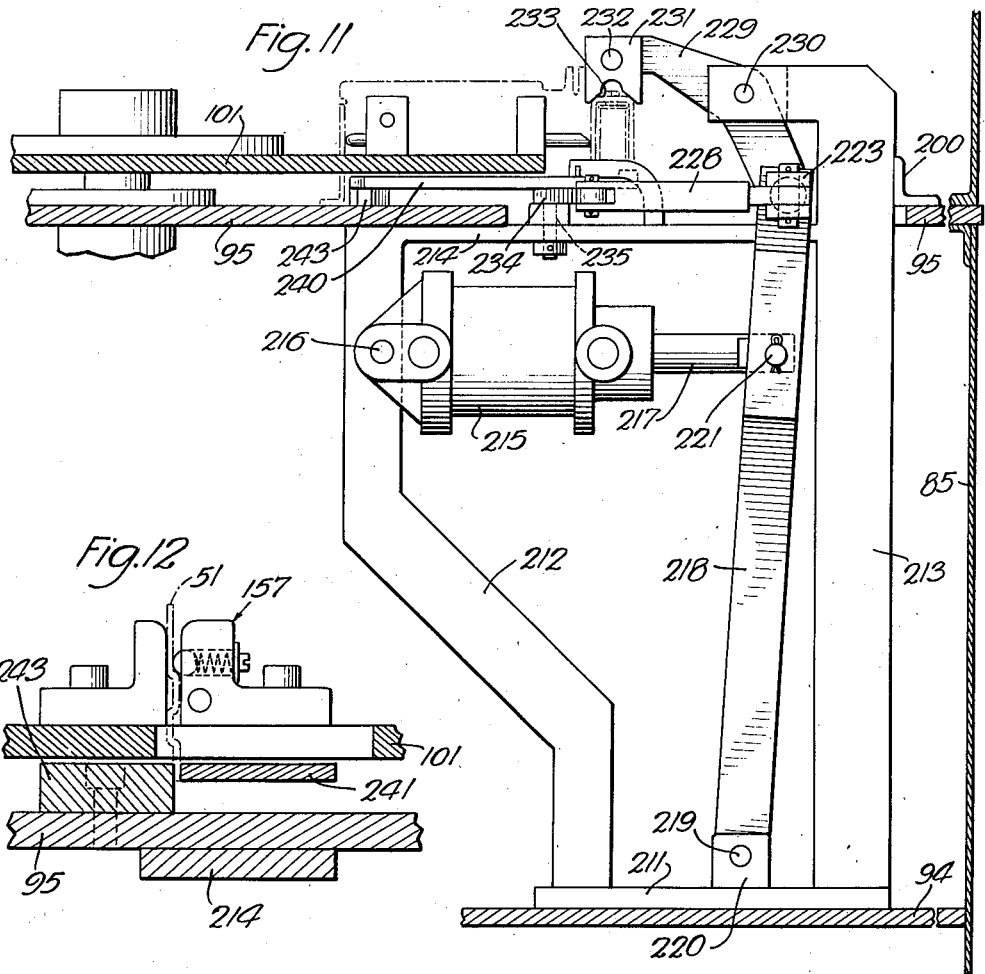
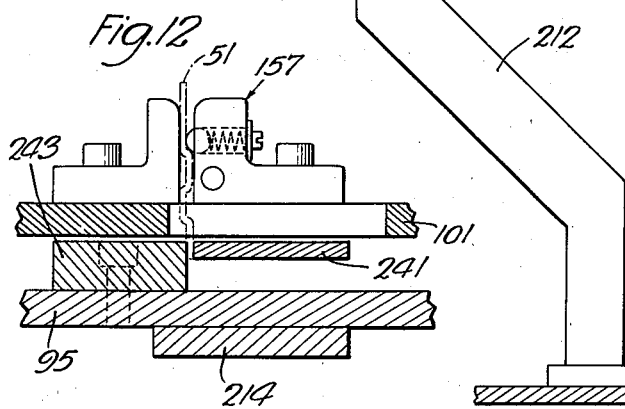
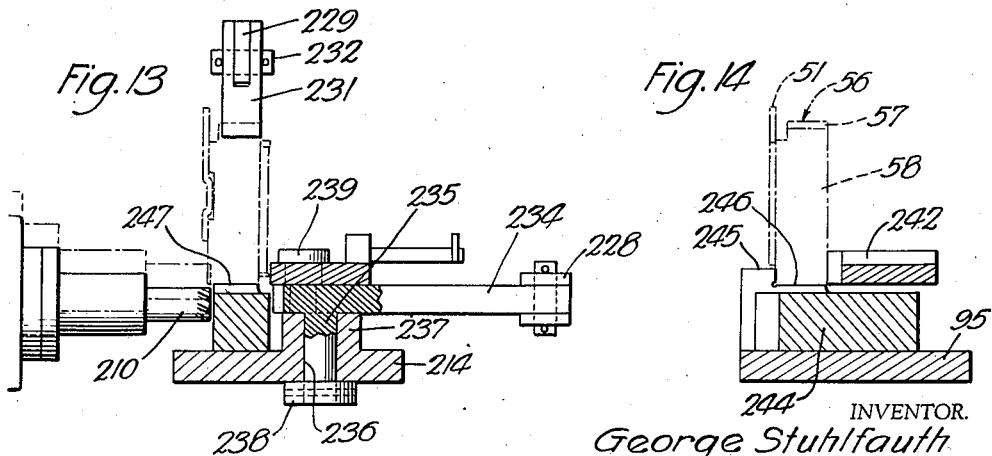
INVENTOR.
George Stuhlfauth
BY Emery Robinson
ATTORNEY Sept. 5, 1944. G. STUHLFAUTH 2,357,615
MACHINING APPARATUS
Filed July 10, 1940 13 Sheets-Sheet 6

INVENTOR.
George Stuhlfauth
BY
Emery Robinson.
ATTORNEY.

Sept. 5, 1944.    G. STUHLFAUTH    2,357,615
MACHINING APPARATUS
Filed July 10, 1940    13 Sheets-Sheet 7

INVENTOR.
George Stuhlfauth
BY Emery Robinson
ATTORNEY.

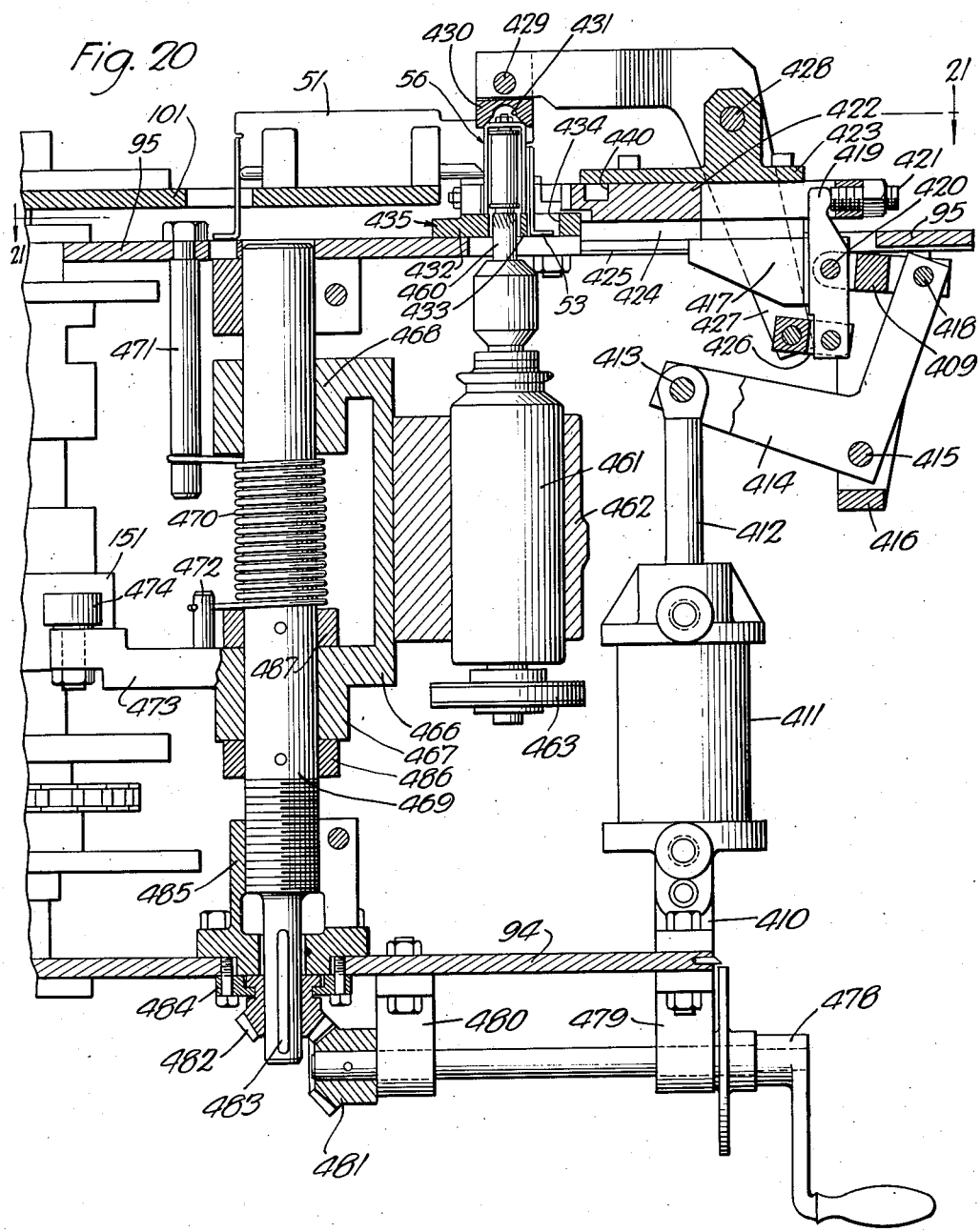

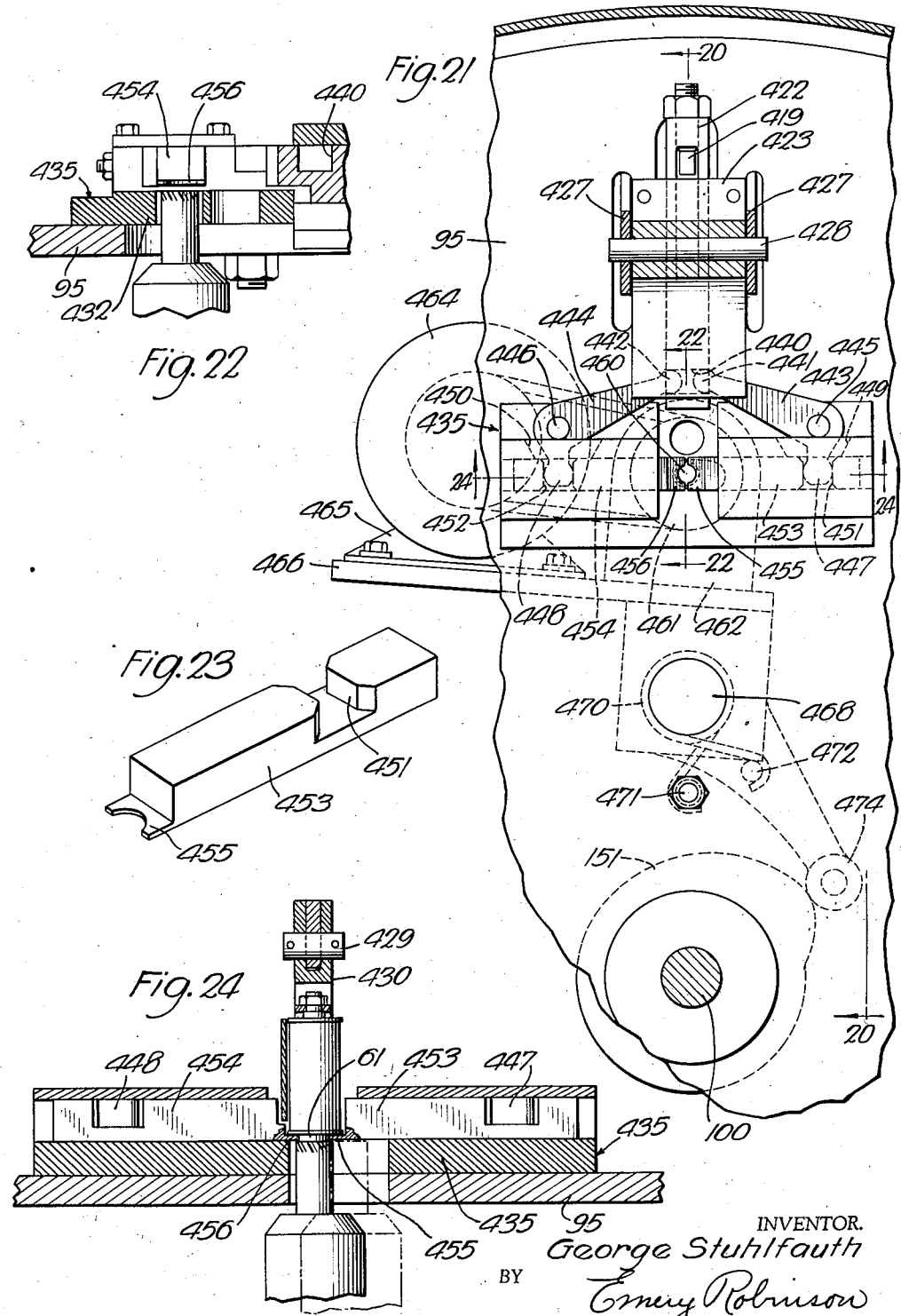

Sept. 5, 1944. G. STUHLFAUTH 2,357,615
MACHINING APPARATUS
Filed July 10, 1940 13 Sheets-Sheet 11
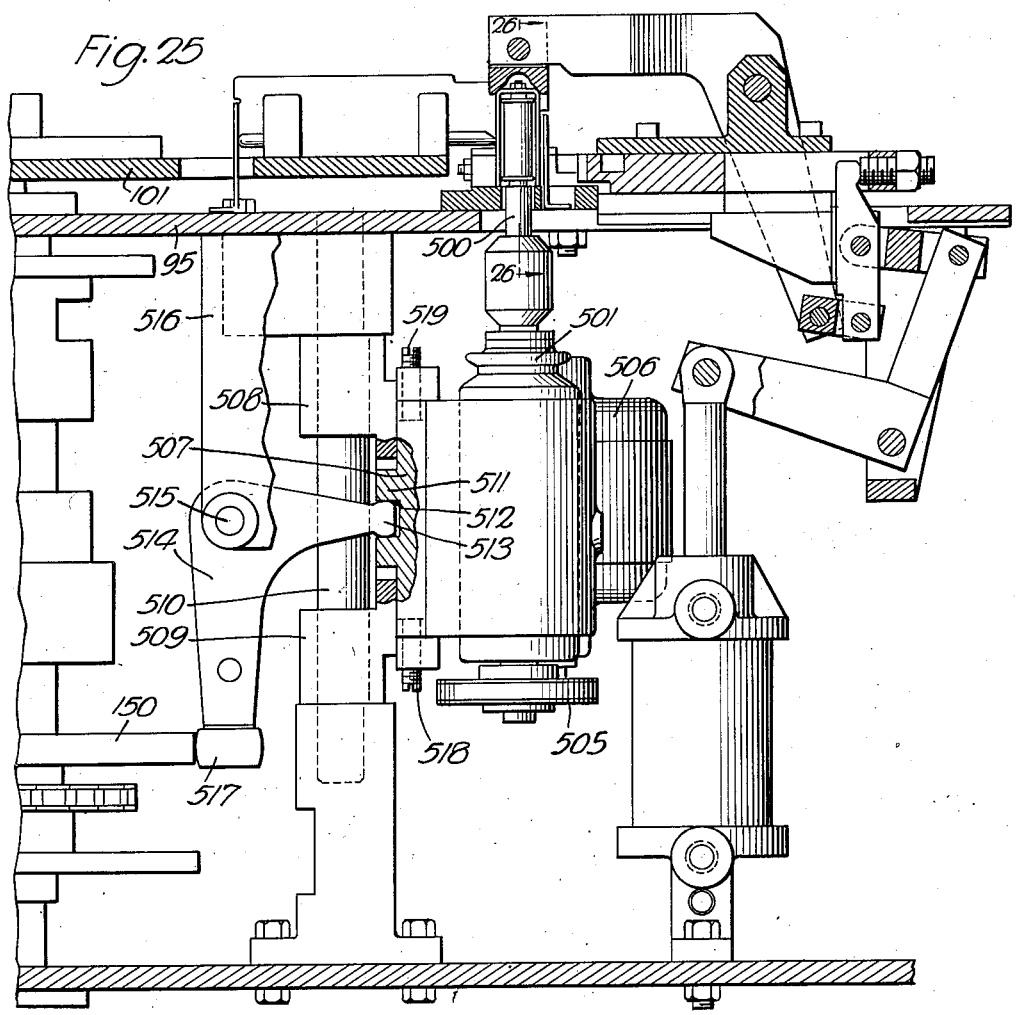
Fig. 25
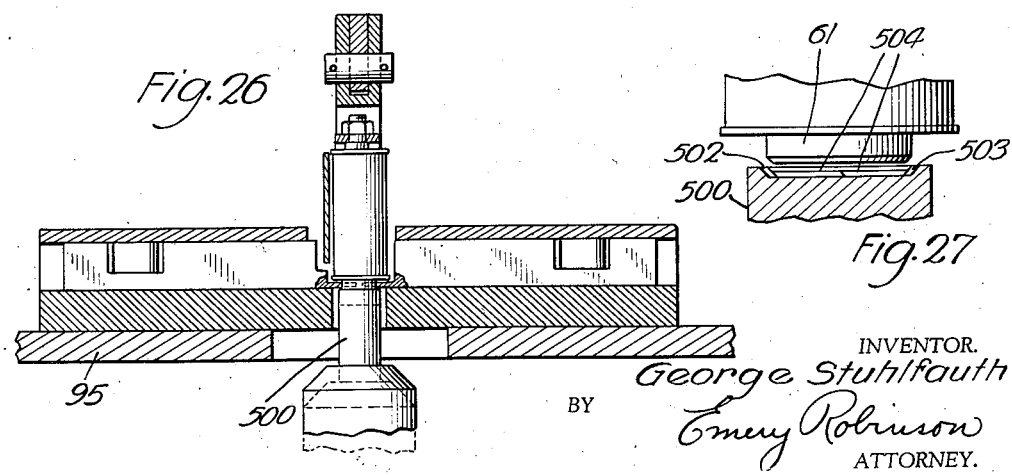
Fig. 26
Fig. 27
INVENTOR.
George Stuhlfauth
BY Emery Robinson
ATTORNEY.

Sept. 5, 1944.  G. STUHLFAUTH  2,357,615
MACHINING APPARATUS
Filed July 10, 1940  13 Sheets-Sheet 12
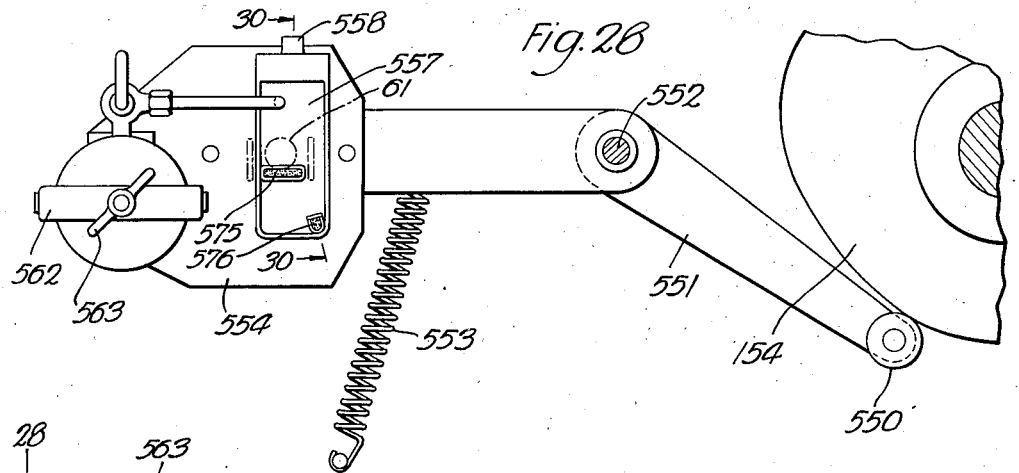
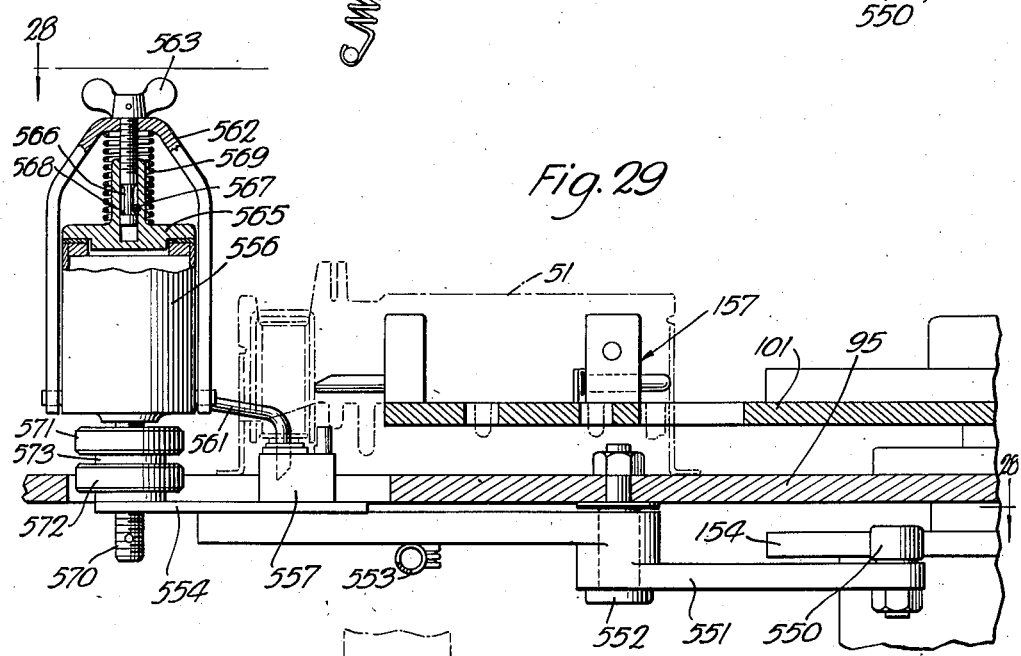
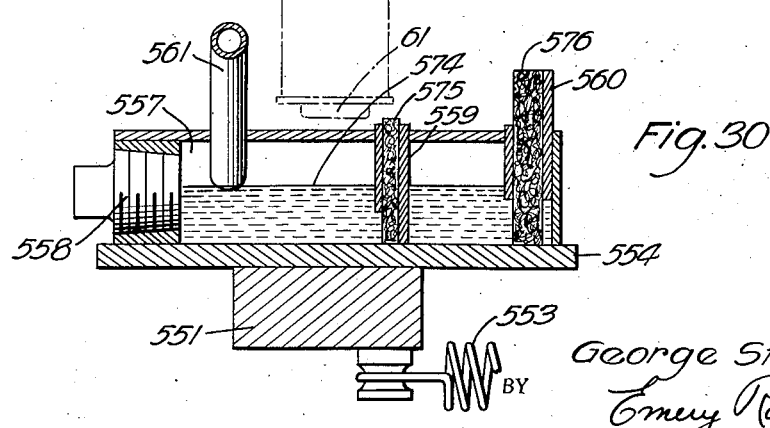
INVENTOR.
George Stuhlfauth
BY Emery Robinson
ATTORNEY.

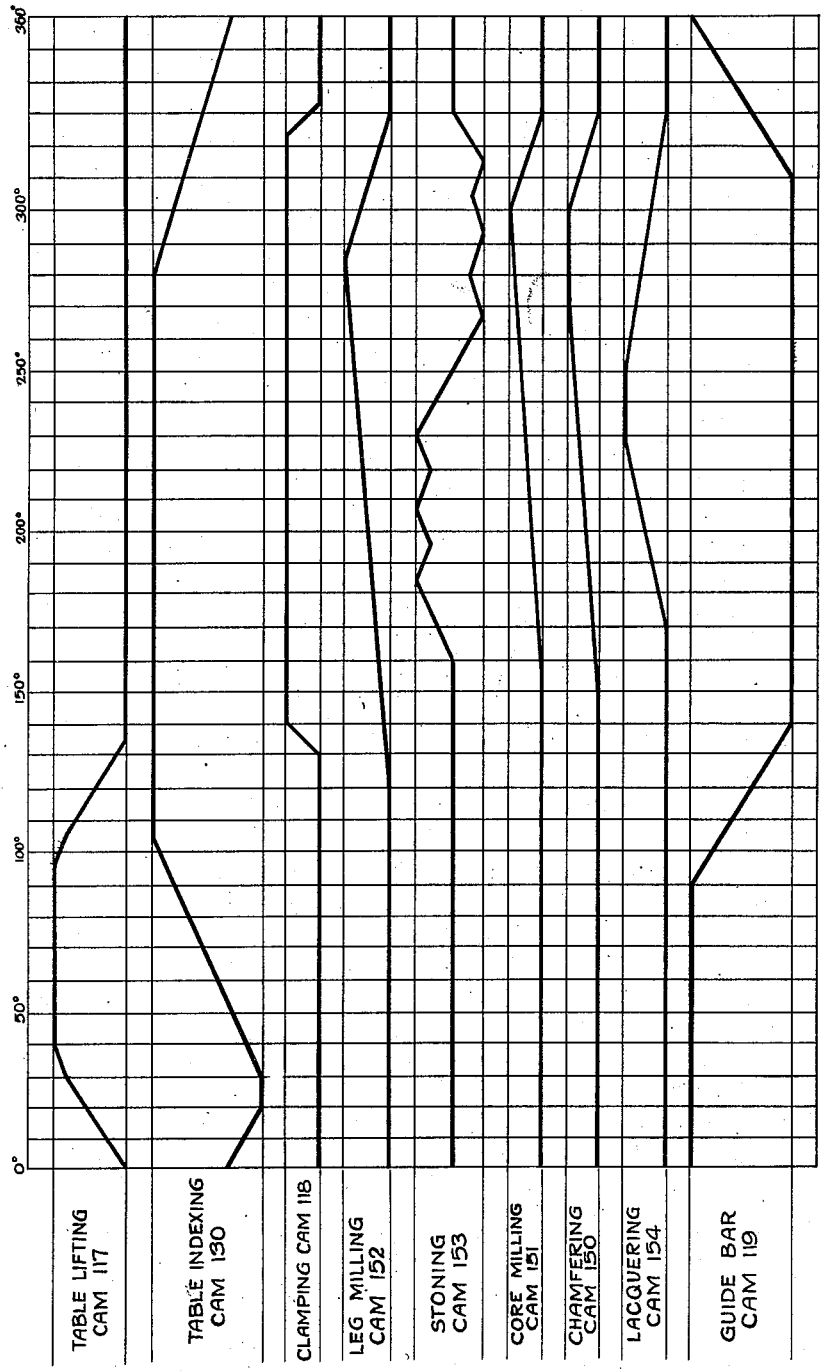

Patented Sept. 5, 1944

2,357,615

UNITED STATES PATENT OFFICE 2,357,615

MACHINING APPARATUS

George Stuhlfauth, Chicago, Ill., assignor to Western Electric Company, Incorporated, New York, N. Y., a corporation of New York Application July 10, 1940, Serial No. 344,677

6 Claims. (Cl. 29—38)

This invention relates to a machining apparatus and more particularly to an apparatus for machining partially assembled telephone switch units.

In the manufacture of precision electrical apparatus, particularly the vertical units adapted for use in automatic telephone exchanges of the cross bar switching type, various parts of the vertical unit are made up of sub-assemblies and assembled to provide a piece of precision apparatus which is expected to operate for years without failure. The cross bar switch vertical units are assembled on frames which carry cooperating parts adapted to be actuated by the vertical unit or control the operation of completing circuits by the vertical unit. It, therefore, becomes essential that the various parts of the apparatus be made with a high degree of precision so that they may be interchangeably assembled. The vertical unit comprises a base member adapted to be mounted on a framework and having fixed thereto an electromagnet, which is formed of a U-shaped pole piece, a core, and a coil wound about the core. The pole pieces are welded to the base member and the core with the coil wound on it is bolted to the pole pieces by providing a threaded portion on the extended end of the core, which extends through the base of the U-shaped pole piece. This unitary structure is adapted to have an armature pivoted on an extension of the base and on one of the legs of the pole piece for actuating switching mechanism when the electromagnet is energized. The base, pole piece, coil and core comprise a sub-assembly for interchangeable assembly with armatures and contact springs to be actuated selectively by the armature. In the manufacture of these sub-assemblies, a number of machining operations are necessary after the various parts of the assembly are assembled and plated and it is to the provision of apparatus for performing these machining operations that the present invention is directed.

It is an object of the present invention to provide apparatus for automatically performing a series of machining operations on precision mechanisms and thereby to reduce the cost of such mechanisms and eliminate numerous manual operations in the manufacture thereof.

In accordance with one embodiment of the invention, a rotary machining apparatus is provided, which includes a turn table automatically indexed step by step about a center spindle to carry a telephone cross bar switch vertical unit to various positions in the apparatus, where machining operations are performed upon it. The apparatus includes three separate tool driving motors mounted about the turn table and a main driving motor for driving the turn table and various of the control cams, which control movements of the various tools in timed relation to the indexing of the part being worked upon. Parts to be worked upon are positioned in the machine at a loading and unloading station and are then carried by the machine into association with the various tools which are mounted as separate units within the machine and about the turn table. These tools comprise five separate units, arranged at five stations around the turn table, the first of which end-mills one of the legs of the pole piece of the switch, the second of which performs a stoning operation on five separate surfaces of the part being worked upon; that is, it removes, by means of small stones, the excess plating material deposited at the tip of the pole pieces and a projecting portion of the base to provide a sharp right angle corner on which the armature of the switch may be pivoted. This station also files off the milling burr from the leg of the pole piece which was end-milled in the previous station. The third unit of the machine receives a part upon indexing of the turn table and end-mills the extending end of the magnet core to cut it slightly under-flush with the faces of the pole pieces so that the armature to be actuated by the electromagnet will always be spaced from the core of the electromagnet. The fourth station in the apparatus contains a chamfering tool, which is automatically moved upwardly into engagement with the core of the magnet to remove the milling burr formed in the preceding station. The part is then indexed to the final operating station, where there is provided a supply of lacquer which, by means of wicks, is applied to the machined surface of the core and the machined surface of the pole piece, which was undercut in the first station. After the parts, from which the plating had been removed in the machining operations, are thus recoated, the part is indexed back to the loading and unloading station, from which it may be removed, and a new part is inserted in place of it.

A better understanding of the invention may be had by reference to the following detailed description, when considered in conjunction with the accompanying drawings, wherein Fig. 1 is a plan view of an apparatus embodying the present invention, part of the cover of the apparatus being broken away to more clearly show the location of the apparatus under the cover;

Fig. 3 is a central sectional view taken substantially on the line 3—3 of Fig. 1 in the direction of the arrows and showing a section through the loading and unloading station and through the central driving spindle and its associated cams and actuating mechanism;

Fig. 4 is an enlarged fragmentary plan view of the switch-holding fixtures at the loading and unloading station, it being understood that there are provided six of these fixtures mounted at spaced intervals about the turn table of the apparatus.

Fig. 5 is a sectional view taken substantially along the line 5—5 of Fig. 4 in the direction of the arrows showing some of the details of the fixture which clamps the part to be worked upon loosely on the turn table during its passage through the apparatus;

Fig. 8 is an enlarged fragmentary plan view, partly in section, showing the first operating station of the apparatus wherein the inside leg of the magnet pole piece is undercut by an end-milling tool. This figure is, in effect, a sectional view on the line 8—8 of Fig. 10, which will be described later;

Fig. 9 is a detail view, in perspective, of a portion of the mechanism for tightly gripping the part to be operated upon at the first or pole piece leg milling station;

Fig. 10 is a fragmentary vertical sectional view, taken on the line 10—10 of Fig. 8 in the direction of the arrows, and showing part of the magnet leg milling station in side elevation;

Fig. 11 is a fragmentary vertical sectional view, taken along the line 11—11 of Fig. 8 in the direction of the arrows, and showing details of the clamping mechanism which clamp a part in the leg milling station;

Fig. 12 is a fragmentary sectional view, taken on the line 12—12 of Fig. 8 in the direction of the arrows, and showing further details of the clamping mechanism at the first station;

Figure 1:
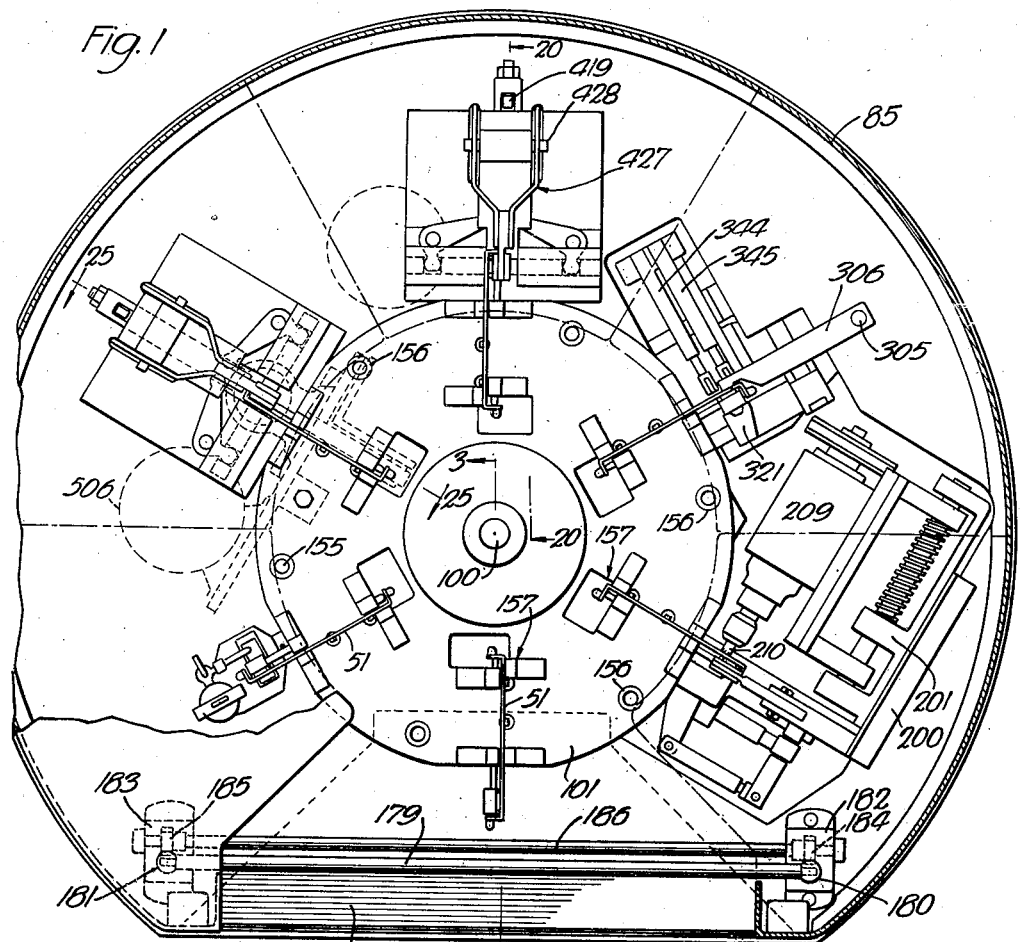
Figure 15:
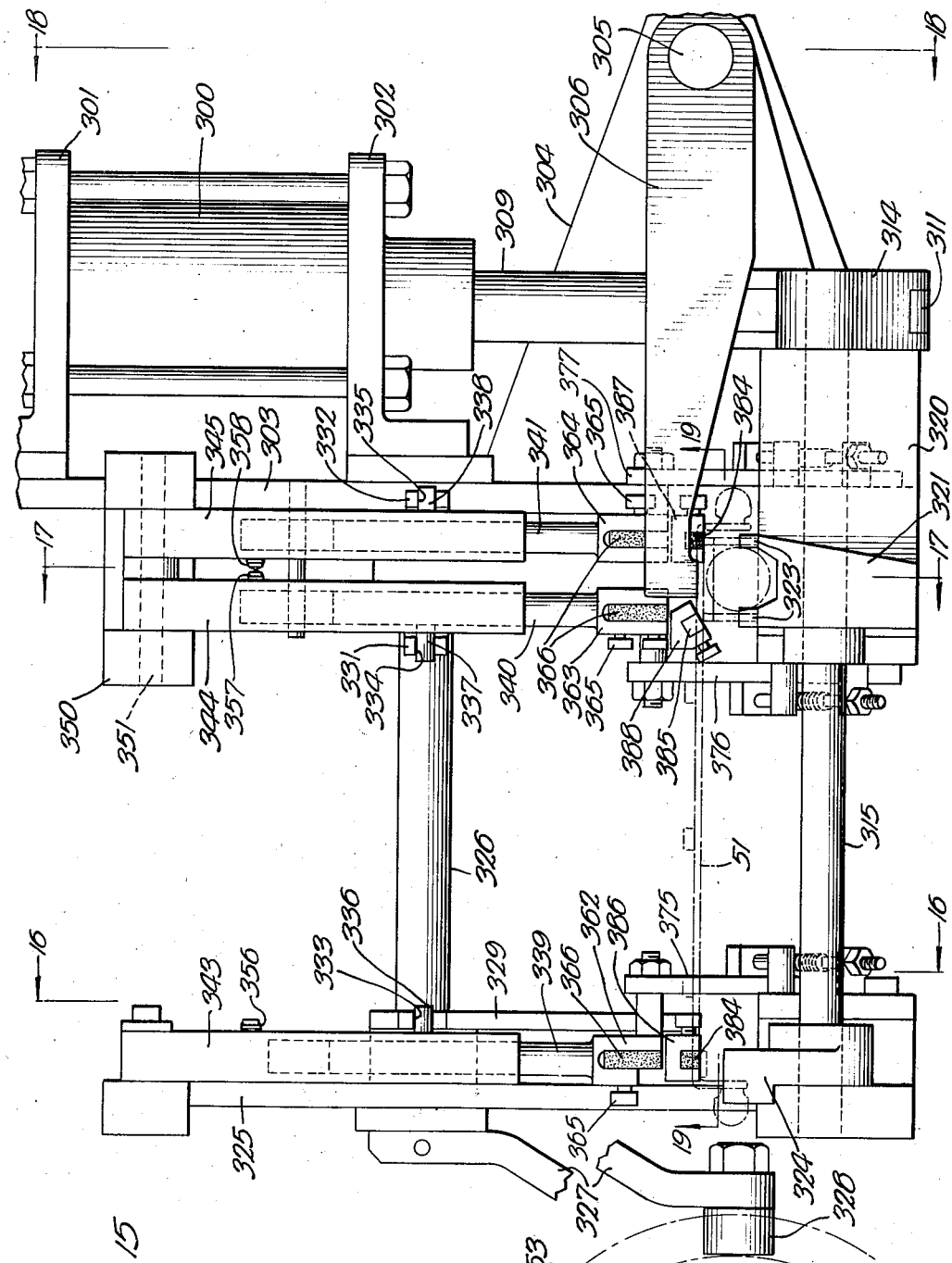
Figure 16:
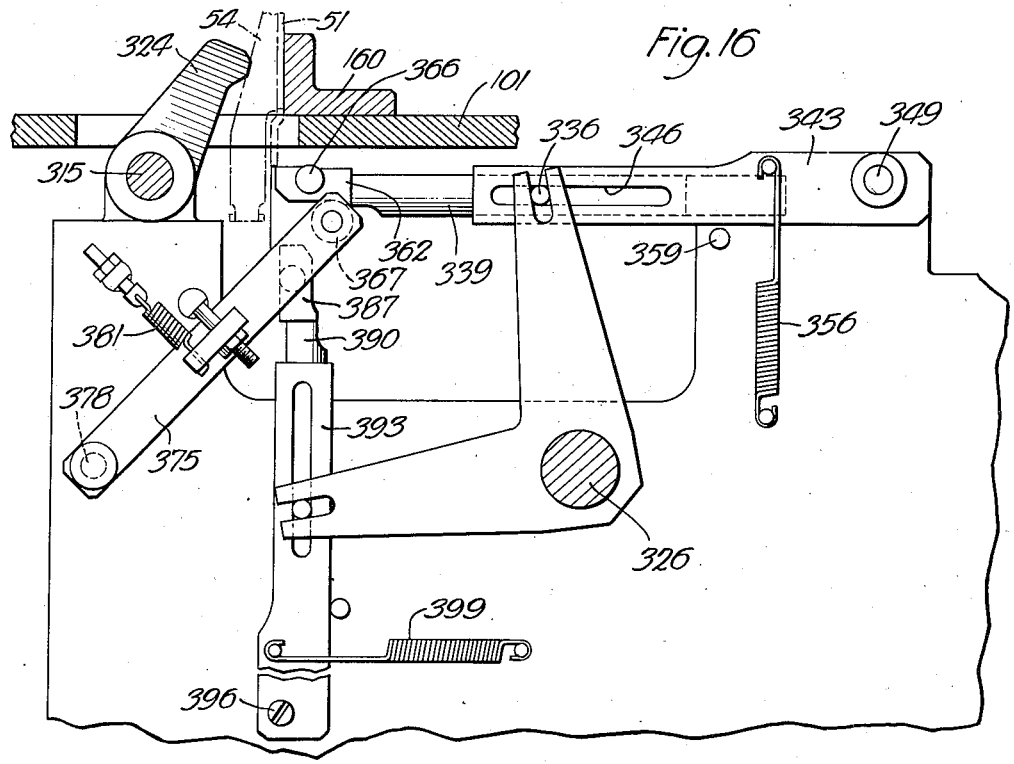
Figure 17:
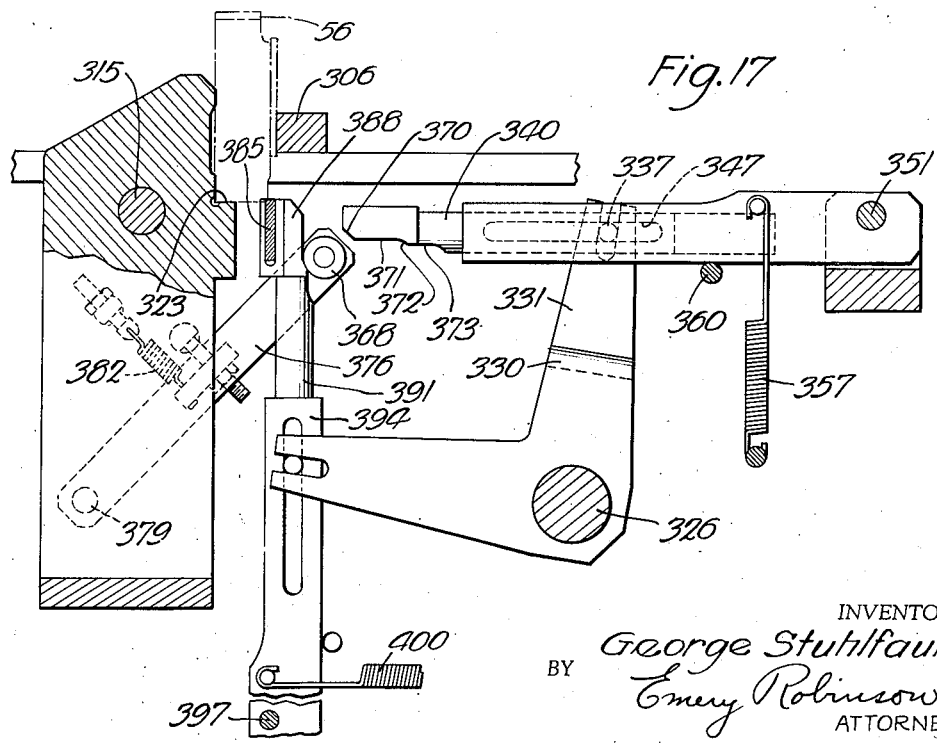
Figure 18:
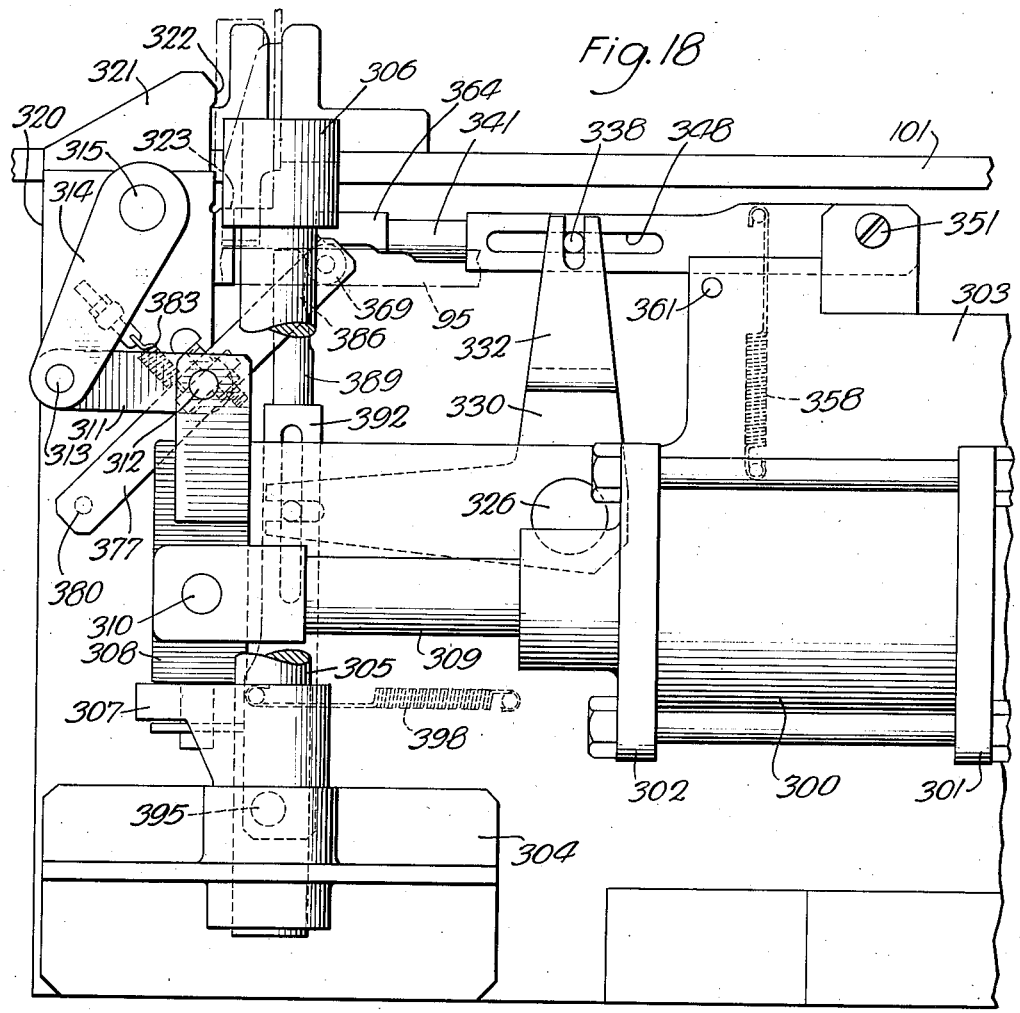
Figure 19:
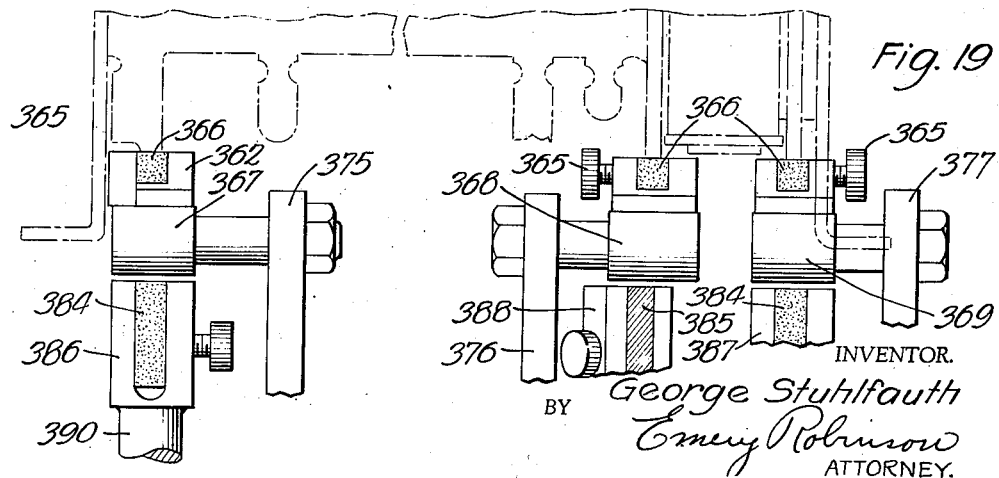

Figs. 13 and 14 are fragmentary sectional views, taken along the lines 13—13 and 14—14 of Fig. 8 in the direction of the arrows, showing further details of the clamping mechanism in the leg milling station;

Fig. 15 is an enlarged fragmentary plan view of the second or stoning and filing station of the machine, parts being broken away to more clearly show the details of the apparatus, and, when considered together with Figs. 16, 17 and 18, which are detail vertical sectional views taken through the apparatus along the lines 16—16, 17—17 and 18—18, respectively, of Fig. 15, show the mechanism for stoning and filing the legs of a pole piece and the projecting portion of the base which cooperates with one of the pole pieces to support the armature;

Fig. 19 is a vertical sectional view taken along the line 19—19 of Fig. 15 in the direction of the arrows showing the stones and file which remove the plating and machining burrs at the filing and stoning station;

Fig. 20 is an enlarged fragmentary sectional view, taken substantially along the line 20—20 of Fig. 1 in the direction of the arrows, and showing the apparatus which mills the end of the magnet core under-flush with the pole pieces of the magnet. This figure also shows, in detail, the mechanism for micrometrically adjusting the milling tool which performs the milling operation;

Fig. 21 is a fragmentary sectional view in plan, taken substantially along the line 21—21 of Fig. 20 in the direction of the arrows, and showing the position of the driving motor for the end mill and the relation of the apparatus to its actuating cams, together with parts of the mechanism for clamping the part being worked on in this station;

Fig. 22 is an enlarged detail fragmentary sectional view, taken on the line 22—22 of Fig. 21 in the direction of the arrows, showing details of the clamping mechanism which holds the part at this station;

Fig. 23 is a view in perspective of one of the clamping details;

Fig. 24 is an enlarged vertical sectional view, taken along the line 24—24 of Fig. 21 in the direction of the arrows, showing further details of the clamping mechanism;

Fig. 25 is an enlarged vertical sectional view, taken on the line 25—25 of Fig. 1 in the direction of the arrows, showing the tools for removing the milling burr from the end of the core of the part being worked on and is quite similar to Fig. 20 since the apparatus in this station is very similar to that in the preceding station;

Fig. 26 is an enlarged vertical sectional view, taken on the line 26—26 of Fig. 25 in the direction of the arrows, showing details of the clamping mechanism and the chamfering apparatus;

Fig. 27 is a fragmentary view, on a greatly enlarged scale, of the extending end of the magnet core with the end of the chamfering tool shown in section to illustrate its construction;

Fig. 28 is a fragmentary plan view of the last station in the apparatus, wherein the lacquer is applied to those parts from which the finish has been machined in the other stations of the apparatus;

Fig. 29 is a view, in side elevation, of the apparatus shown in Fig. 28, parts being broken away to more clearly illustrate the construction of this part of the machine;

Fig. 30 is an irregular vertical sectional view, taken along the line 30—30 of Fig. 28 in the direction of the arrows; and Fig. 31 is a timing chart showing the time of operation of the various parts with respect one to another.

Figure 2:
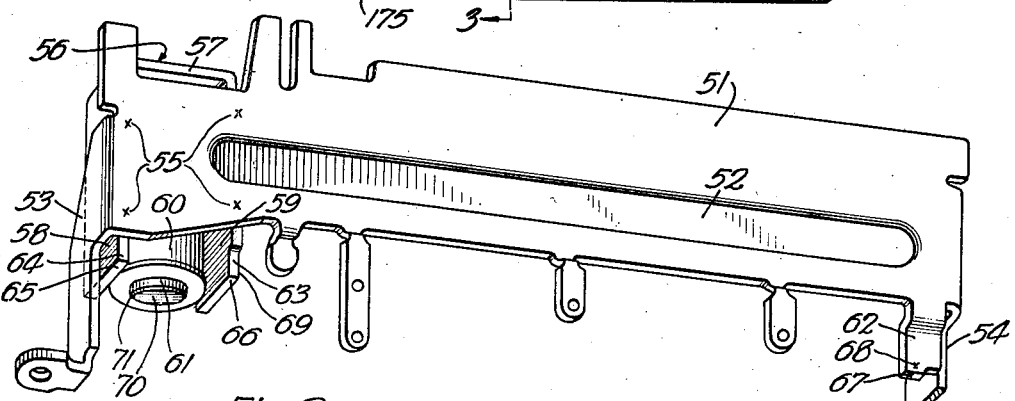
Fig. 2 is a view in perspective of a cross bar switch vertical unit sub-assembly, including a base member and an electromagnet and its pole pieces, which are to be machined in the apparatus.

In the drawings, wherein like reference characters designate the same parts throughout the several views, there is shown an apparatus designed to perform machining operations on a cross bar switch vertical unit base assembly, which is illustrated in Fig. 2, and which comprises a main base member 51, having a central longitudinal embossing 52, which serves to add rigidity to the base structure. Formed integrally with the base, are a pair of bent-over mounting arms 53 and 54, whereby the unit may be mounted on a framework (not shown) after the completion of the assembly of the various parts of the unit. Welded to the unit, at the points 55—55, is a U-shaped pole piece, designated generally by the numeral 56, and having a base portion 57 and extending legs 58 and 59. Nested within the pole piece 56, is a magnet coil 60 wound around a core 61, which extends through the length of the coil and out through the base portion 57 of the pole piece and holds the coil in place on the pole piece 56. The main base member has formed integrally with it a number of extending lugs, which are not of interest in connection with the present invention, and it also has an extending portion 62, which cooperates with the leg 58 of the pole piece to pivotally support an armature (not shown) on the main base member.

The machine covered by the present invention is designed to prepare the main base member 51 and parts fixed thereto, as shown in Fig. 2, for the reception of the armature (not shown) and is designed to perform various operations on the core 61, the legs 58 and 59 of the pole piece 56 and on the extending portion 62 of the base. In the apparatus covered by the present invention, the leg 59 of the pole piece 56 is to be undercut, as shown at 63, in the first operative station of the machine. In the second operative station of the machine, the surfaces designated 64, 65, 66, 67 and 68 are to be stoned and the edge 69 is to be filed to remove the excess plating material from the surfaces 64, 65, 66, 67 and 68 and remove the milling or machining burr from the edge 69. In the third station of the apparatus, the end 70 of the core 61 is to be end-milled. It is slightly under-flush with the surfaces 65 and 66 of the legs 58 and 59. In the fourth station of the apparatus, the milling burr formed on the edges of the core in the third station of the apparatus is removed by chamfering the end of the core, as shown at 71. In the fifth and final station of the apparatus, the end 70 and chamfered surfaces 71 of the core 61, and the undercut portion 63 of the leg 59, are to have a coating of lacquer applied to them in the area where the plating has been removed from the metal, it being understood that base member 51 and pole piece 56, after they are welded together, are plated and that the stoning operations simply remove the excess plating material from the surfaces 64, 65, 66, 67 and 68.

In the description of the apparatus for performing these operations on the vertical unit subassembly, the general features of the apparatus will first be described and then each of the stations will be described separately to simplify the description of the machine as much as possible.

*Main assembly and loading station*

Figure 6:
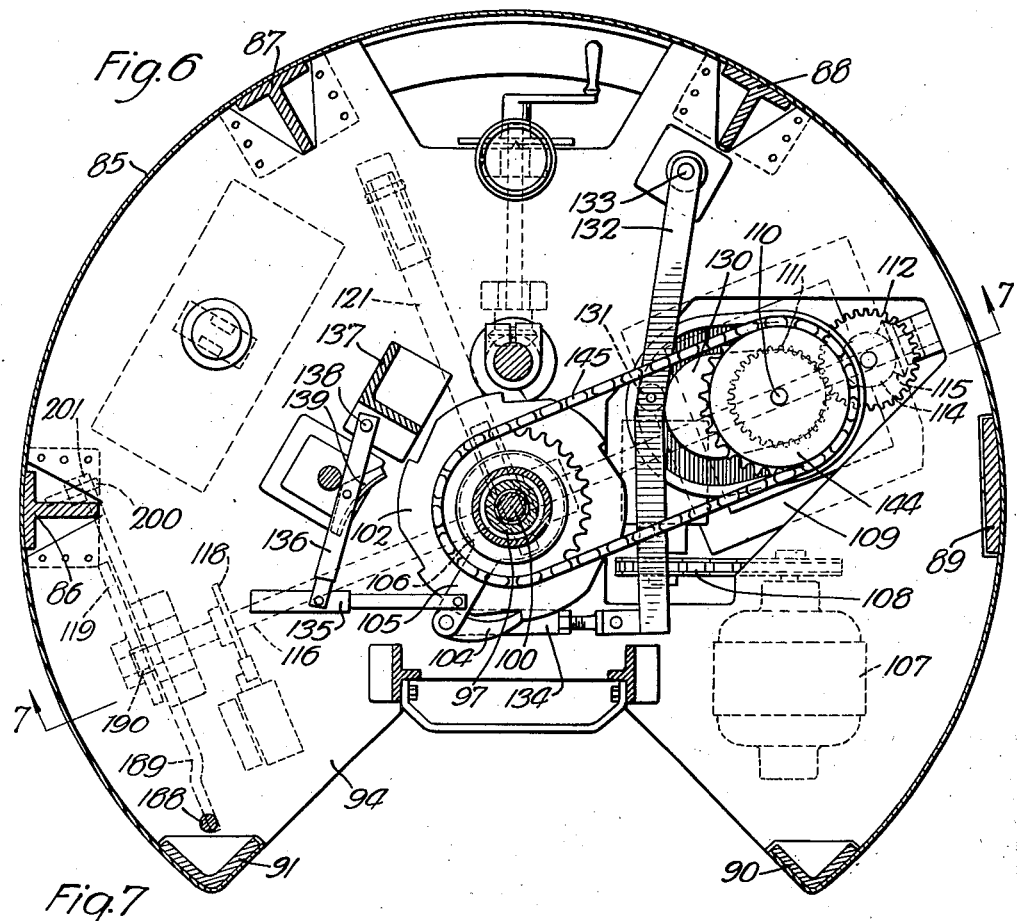
Fig. 6 is a plan view in section, taken substantially along the line 6—6 of Fig. 3 in the direction of the arrows, and shows somewhat in detail the main driving motor and its associated parts, together with the mechanism for intermittently driving the main spindle.

The machine, in general, comprises a circular casing 85, as shown most clearly in Figs. 1 and 6, which encloses all of the various operating parts of the apparatus. Within the casing 85 are a number of standards 86, 87, 88, 89, 90 and 91 (Fig. 6), which extend upwardly from a sub-base 92. The sub-base 92 rests on a circular angle member 93, which may be mounted upon the floor and fixed thereto in any suitable manner. The standards 86 to 91, inclusive, are of various shapes and their particular construction is immaterial to the present invention, except that they serve to support a main base member 94 and a support plate 95 on which the various parts of the apparatus are mounted, as will be described in detail hereinafter.

Figure 7:
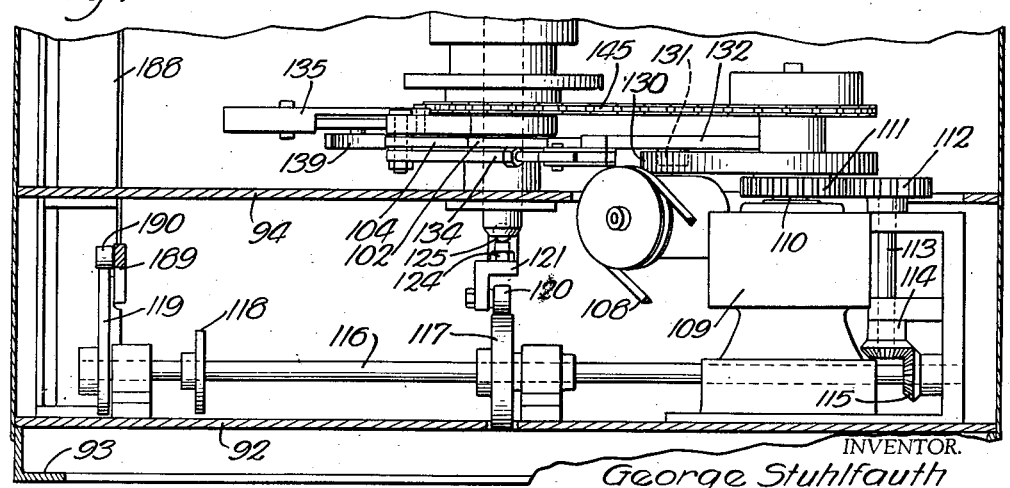
Fig. 7 is a fragmentary vertical sectional view, taken substantially along the line 7—7 of Fig. 6 in the direction of the arrows, and showing, in side elevation, some of the parts shown in Fig. 6.

Mounted centrally in the main base member 94, particular reference being had at this time to Figs. 3, 6 and 7, is a main bearing 96, in which there is freely rotatable a sleeve 97. An upper bearing 98 is fixed in the supporting plate 95 and cooperates with the bearing 96 to rotatably support the sleeve 97. Keyed to the sleeve 97 at 99 is a spindle 100, which is rotatable with the sleeve 97, but which may be reciprocated vertically within the sleeve. The spindle 100 has mounted at its upper end a turn table 101, which, upon reciprocation of the spindle, will be elevated and lowered and which, upon rotation of the spindle, will be carried around by the spindle to carry parts supported by it to the various stations of the machine. A ratchet 102 surrounds and is keyed to the sleeve 97 by means of a key 103 (Figs. 3 and 6). The ratchet 102 is adapted to be driven by a pawl 104 mounted upon a pawl arm 105, which is formed integrally with a collar 106 oscillatable about the hub of the ratchet 102. Power is supplied for driving the pawl 104 from the motor 107, which is mounted upon the sub-base 92, and, through a belt 108, drives a speed reducer 109 (Figs. 6 and 7). The main drive shaft extending from the speed reducer is designated 110 and carries a gear 111, which, in turn, meshes with a gear 112 mounted on a stud shaft 113, and carrying a beveled gear 114 meshing with a beveled gear 115. The beveled gear 115 is mounted upon a cam shaft 116, suitably journalled on the sub-base 92, and carrying three cams 117, 118 and 119. The cam 117, as most clearly shown in Figs. 3 and 7, has a cam roller 120 bearing against it and supporting a cam arm 121. The cam arm 121 is pivotally mounted on a bracket 122 extending downwardly from the main base member 94 by means of a pin 123 (Fig. 3). Mounted upon the cam arm 121, directly above the cam roller 120, is a threaded adjustable abutment 124, which engages a pivot ball 125 suitably fixed in the lower end of the spindle 100, whereby reciprocatory motion is imparted to the spindle in a vertical plane to raise the turn table 101 cyclically in the operation of the machine. Directly above the gear 111, there is mounted, upon the shaft 110, a grooved cam wheel 130, in the groove of which there is positioned a cam roller 131. Cam roller 131 is rotatably mounted on a cam lever 132 (Figs. 6 and 7). Cam lever 132 is pivotally mounted, at 133, on the main base member 94. An adjustable link 134 interconnects the free end of the cam lever 132 with the pawl arm 105 and imparts oscillatory motion to the pawl. In other words, for each cycle of the cam wheel 130, the pawl 104 will be oscillated about the sleeve 97 to step the ratchet 102 one place. Pivotally connected to the pawl arm 105 is a link 135, which has pivotally connected to it a lever 136. The lever 136 is pivotally connected to a bracket 137 mounted on the main base member 94 by means of a pivot pin 138 and carries a loosely mounted brake shoe 139 adapted to engage the surface of the ratchet 102 as the ratchet reaches the end of its indexing movement each time the ratchet is indexed.

A further extension of the shaft 110 carries a chain gear 144, which drives a chain 145 to transmit rotary motion to a chain gear 146, suitably fixed to a cam sleeve 147. The cam sleeve 147 is mounted for rotation about the sleeve 97 by means of bearings 148 and 149 and has a series of cams 150, 151, 152, 153 and 154 fixed to it. The cam 150 drives the chamfering unit of the apparatus; the cam 151 drives the milling tool for milling the core face; the cam 152 drives the apparatus for under-cutting one of the legs of the magnet pole piece; the cam 153 drives the cam for stoning the projecting portion of the vertical unit base, the two legs of the magnet pole piece, and the apparatus for filing the intermediate leg of the magnet pole piece, which has been under-cut; and the cam 154 drives the lacquer applying mechanism. The various pieces of apparatus which these cams drive have been mentioned in a general way only and will be described in detail hereinafter.

From the foregoing, it is believed to be apparent that the spindle 100 may be moved upwardly by the cam 117, and, while in an upward position, may be rotated through one-sixth of a revolution by means of a pawl 104 and ratchet 102. When the turn table mounted on the end of the spindle 100 is in its lower position, as shown in Fig. 3, a pin 155 (Fig. 1) extending upwardly from the upper surface of the supporting plate 95 will enter one of a series of bushings 156 set into the turn table 101 and accurately position the turn table. When the spindle 100 is raised, the bushing 156 will be drawn off of the pin 155 and rotary motion may be imparted through the sleeve 97 and spindle 100 to the turn table 101 to carry a piece of apparatus mounted in one of the sets of fixtures, designated generally by the numeral 157, step by step to the various machining positions of the apparatus. There are six of the sets of fixtures 157 provided about the periphery of the turn table 101 and are designated generally in Fig. 1 by the numeral 157, the details of these fixtures being shown in Figs. 3, 4 and 5. As seen in Fig. 4, the fixture 157 comprises four angle brackets 160, 161, 162 and 163. The brackets 160 and 161 serve as bases against which the main base member 51 of the vertical unit may be pressed by a spring-pressed ball 164 mounted in the angle bracket 162 and engaging against the embossing 52 of the main base member of the vertical unit. The angle bracket 162 also has mounted in it a spring-pressed plunger 165, which bears against the mounting arm 54 of the vertical unit to draw the inner leg 59 of the pole piece 56 against a fixed stop 166 mounted in the angle bracket 163. It will be understood that this fixture 157, of which there are six provided, simply serves to loosely hold the vertical unit sub-assembly during the travel of the turn table 101 to carry the parts being worked upon to the various operating stations of the apparatus.

*The loading and unloading station*

An operator feeding parts to and removing them from the apparatus sits at the machine adjacent the flattened forward portion thereof, as shown in Fig. 1, and after starting the machine in operation through the operation of any suitable switch to supply electrical current to the various electrical motors, the turn table will be intermittently indexed and all of the parts of the apparatus will operate simultaneously to perform operations on a sequence of articles placed in the fixture 157 by the operator. At the loading and unloading station, there is provided means for preventing the operator's hands and forearms from getting caught in the apparatus. This mechanism comprises a hinged gate 175, hinged at 176 to an angle member 177. The hinged gate folds downwardly to its open position, as shown in dot and dash lines at 178, every time the turn table 101 assumes the position as shown in Figs. 1 and 3. The upper half of the hinged gate 175 is set into a round rod 179, which is pivoted at its opposite ends in a pair of vertically reciprocable racks 180 and 181. The racks 181 are slidable in bearing blocks 182 and 183, respectively, in which there are positioned gears 184 and 185, respectively, which mesh with their respective racks. The gears 184 and 185 are interconnected by a shaft 186. A downwardly extending portion 187 of the rack 181 has fixed to it a push rod 188 (Figs. 3, 6 and 7). The push rod 188 is mounted on the extending end of a pivoted lever 189, which carries a cam roller 190. The lever 189 is pivoted at 200 to a bracket 201 mounted on the side of standard 86, and once in each cycle of the machine, that is, each indexing of the turn table 101, the push rod 188 will be reciprocated to rotate the gears 184 and 185 first in one direction and then in the opposite direction to move the gate 175 upwardly and hold it in that position during the indexing of the turn table 101. When the gate 175 is in its lowermost position, the turn table 101 will be stationary and the various operating mechanisms at the five operating stations will be performing work on the part being machined. During this interval, an operator may remove a vertical unit sub-assembly from the fixture 157 in front of him at that particular time and may insert another sub-assembly in the fixture 157 so that it may be carried around at the various stations and properly machined. It will be understood that the fixture 157 simply holds the vertical unit sub-assembly in position by light spring pressure exerted on the spring-pressed pawl 164 and the plunger 165.

*Leg milling station*

The turn table 101 rotates in a counter-clockwise direction, as indicated by arrow (Fig. 1). A sub-assembly mounted in the fixture 157 at the loading and unloading station will first be carried to the leg milling station. This portion of the apparatus is most clearly shown in Figs. 8, 9, 10, 11, 12, 13 and 14. At the leg milling station, there is mounted, upon the supporting plate 95, an angle member 200, which has mounted on it a pivot support 201, in which a relatively long pivot pin 202 is positioned for pivotally supporting a bracket 203. The bracket 203 is normally urged upwardly, as viewed in Fig. 8, by a coiled spring 204, one end of which abuts a portion of the bracket 203 and the other end of which abuts a portion of the pivot support 201 to take up end play in the bracket when milling is being done at this station. A cam arm 705, fixed to the bracket 203, has a cam roller 206 mounted at its left end (Figs. 8 and 10) and riding upon the surface of cam 152 mounted upon the main cam sleeve 147. The bracket 203 carries on it a motor 207, which is supplied with energizing current from any suitable source of supply (not shown) and which, through the belt 208, drives a milling tool assembly 209 carrying an end mill 210. The milling tool assembly 209 is also mounted upon the bracket 203 and as the cam roller 206 alternately engages the high and low parts of the cam 152, the motor 207 and end mill assembly 209 will be rocked through a slightly arcuate path to move the end mill 210, which is being driven at high speed, across the leg 59 of the pole piece 56, thereby to form the undercut 63.

The fixture 157 which carries the sub-assembly being worked upon on the turn table 101 does not hold the sub-assembly rigidly enough to permit it to be worked upon by the various mechanisms in the apparatus and at each of the stations where machining operations are formed on the sub-assembly, clamping means for holding the sub-assembly rigid are provided. At the leg milling station, this clamping mechanism comprises a rigidly mounted framework made up of an auxiliary base 211 mounted on the main base member 94 and upwardly extending standards 212 and 213 suitably secured thereto. The framework is rigidly connected at the upper end of the standard 212 (Fig. 11) to a plate 214. The plate 214 is secured to the supporting plate 95 and may be attached to the standards 212 and 213 in any suitable manner, for example, by welding. The standard 213 extends upwardly beyond the supporting plate 95 and serves as a pivot for part of the clamping mechanism, whereas the standard 212 serves to support a pneumatic cylinder 215, which is connected to the standard 212 by a pivot pin 216. The cylinder 215 is supplied with air under pressure at predetermined intervals in the cycle of operation of the machine. Specifically, a blast of air is admitted to the cylinder 215 each time the turn table 101 is indexed and moved to its downward position. When a blast of air is admitted to the cylinder 215, it will drive its piston 217 outwardly to the right (Fig. 11) to rock a main actuating lever 218 about its pivot 219. The pivot 219 is mounted in a bracket 220 extending upwardly from the auxiliary base 211 and is pivotally connected, by means of a pin 221, to the piston 217. The upper end of the lever 218, as shown most clearly in Fig. 8, has loosely mounted therein a shouldered yoke 223, a reduced portion 224 of which loosely fits within an aperture 225 in the lever 218 being held in place therein by a collar 226 pinned on the yoke 223. One end of the yoke 223 is bifurcated, as shown at 227, to receive a link 228 and the other end of the yoke 223 extends through a bell crank lever 229, which is, in turn, pivoted, by means of pins 230, in a horizontally extending portion of the standard 213. Relatively loosely mounted on the free end of the bell crank lever 229 is a clamping element 231, which is secured to the bell crank lever 229 by means of a pin 232 and which has a substantially V-shaped contour on its under-surface, as shown at 233, adapted to engage the base portion 57 of the pole piece 56 and to clamp it in place. The link 228 is pivotally connected to a lever 234, and upon movement of the link 228, the lever 234 will be rocked about a pivot pin 235, which is formed integrally with the lever 234 and is freely rotatable in an aperture 236 (Fig. 13) formed in the plate 214, a projection 237 serving as a bearing for the pin 235, which is held in the aperture 236 by means of a collar 238 fixed to its extending end. Secured in the lever 234 is a headed pin 239, about which a clamp 240 may rock within predetermined limits to apply equal pressure to a main base member 51 to be clamped in place by it, clamping projections 241 and 242 being provided for engaging the base member 51 loosely held in the fixture 157. Cooperating with the clamping projections 241 and 242 are a pair of anvils 243 and 244, which are mounted upon the supporting plate 95. In this station, the clamping projection 241 will engage the base 51 and clamp it against the anvil 243, as shown in Fig. 12, and the clamping projection 242 will engage the leg 58 of the pole piece 56 and clamp it against a shoulder 245 on the anvil 244, whereas the clamping element 231 will hold the end faces of the legs 58 and 59 of the magnet pole piece 56 down against surfaces 246 and 247 on the anvil 244.

It is believed to be apparent, from the foregoing description, that when the turn table 101 is indexed to carry a part loosely mounted in one of the fixtures 157 to the leg milling station, the part to be worked upon will be clamped by means of the clamping elements 231 and clamping projections 241 and 242 against the anvils 243 and 244 when air under pressure is admitted to the cylinder 215 and that the clamping elements and clamping projections each exert equal pressure on the various parts of the assembly being worked upon due to the yoke connection described in detail hereinbefore. When a sub-assembly to be worked upon reaches the leg milling station and is thus clamped in place, the cam 152 will actuate the cam arm 205 and will rock the bracket 203, thereby to carry the end mill 210, which is rotating at high speed up across the face of the leg 59 of the pole piece 56 and thereby form the under-cut 63 thereon. After the end mill is moved up and back under control of the cam 152, the air under pressure in the cylinder 215 will be exhausted to the atmosphere in timed relation to the portion of the cam 152 and under control of the cam 118. This control mechanism for controlling the supply of air under pressure to the cylinder 215 has not been shown in detail and may comprise any suitable valve mechanism, of which there are numerous commercial embodiments. When the milling of the leg 59 has been completed, the sub-assembly being worked upon, as pointed out, will be released by the clamping mechanism and the turn table 101 will be elevated and indexed one step to carry the sub-assembly, which has thus been machined, to the next operating station, which is the stoning and filing station.

*Stoning and filing station*

The mechanism for stoning the surfaces 64, 65, 66, 67 and 68 and for filing the edge 69 of the sub-assembly being worked upon are most clearly shown in Figs. 15 to 19, inclusive, to which reference will now be had. After the turn table 101 has been indexed to carry a sub-assembly to the stoning and filing station, the turn table 101 will be lowered to the position as shown in Fig. 3, thereby to carry the sub-assembly base 51 to the position shown in dot and dash lines in Fig. 15. In this position, the sub-assembly will be clamped and held tightly by pneumatic actuated clamping mechanism, the actuating force for which is provided by a pneumatic cylinder 300, which is mounted, by means of brackets 301 and 302, on a vertically extending plate 303, which is suspended from the supporting plate 95, a fragment of which is shown in dot and dash lines in Fig. 18 and which is not shown in Fig. 15, but which is directly above the apparatus as shown in Fig. 15. The plate 303 has a bearing block 304 mounted upon it in which there is journalled a vertically extending shaft 305, which extends upwardly above the level of the supporting plate 95 and has fixed to its end a clamping arm 306. Fixed to the shaft 305 is a lever arm 307 (Fig. 18), in which there is pivotally mounted a yoke 308, adapted to be actuated by a piston rod 309, driven by the cylinder 300, and pinned to the yoke 308 by means of a pin 310. The yoke 308 also serves to actuate a link 311, which is pivoted on the yoke at 312 and connected at its opposite end by means of a pin 313 to a lever 314, which is, in turn, secured to a rock shaft 315. The shaft 315 is journalled in a bearing block 320 mounted on a plate 303 and having formed integrally with it an upwardly extending abutment 321 having a surface 322 adapted to be engaged by the rear surface of the legs 58 and 59 of the pole piece 56 when the main base member 51 of the sub-assembly is engaged by the arm 306. The bearing block 320 is also provided with a pair of surfaces 323—323 on which the rear ends of the legs 58 and 59 of the pole piece 56 will rest when the sub-assembly is clamped in this position. The end of the sub-assembly being worked on, which has an extending portion 62 thereon, is clamped against the angle bracket 160, as shown in Fig. 16, by a clamping element 324, which is fixed to the shaft 315 and engages the sloping surface of the supporting arm 54 of the sub-assembly and forces the base 51 of the sub-assembly against the angle bracket 160.

With a sub-assembly rigidly held by the clamping assembly just described upon the admission of air to the cylinder 300, the surfaces 64, 65, 66, 67 and 68 are stoned by the stoning mechanism and the edge 69 is filed by the filing mechanism, as will now be described. Extending downwardly from the supporting plate 95 is a vertically extending plate 325, which is quite similar to plate 303, and, together with the plate 303, provides a bearing in which a rock shaft 326 is oscillatable. Fixed to the left end of the shaft 326 (Fig. 15) is a cam arm 327 carrying a cam roller 328, which engages the cam 153 on the main cam shaft or spindle assembly, as shown in detail in Fig. 3. The shaft 326 also has fixed to it a pair of bell cranks 329 and 330 and the lever 330 is bifurcated to provide two upwardly extending arms 331 and 332. The bell crank 329 has a slot 333 formed in its upwardly extending arm and the arms 331 and 332 have slots 334 and 335 formed in them to receive pins 336, 337 and 338, respectively, which extend outwardly from slide members 339, 340 and 341, respectively. The slide members 339, 340 and 341 are slidably positioned in slide supports 343, 344 and 345, respectively, which have slots 346, 347 and 348, respectively, through which the pins 336, 337 and 338 extend for engagement by the slotted ends of the bell cranks 329 and 330. The slide support 343 is pivotally mounted on a pivot pin 349 mounted on the vertically extending plate 325 and the slide supports 344 and 345 are pivotally mounted in a bearing 350 being supported by a common pivot pin 351. Each of the slide supports 343, 344 and 345 are urged downwardly by coil springs 356, 357 and 358, respectively, into engagement with stop pins 359, 360 and 361 to normally retain them substantially in the position shown. The slide members 339, 340 and 341 have mounted at their left ends (Figs. 16, 17, and 18) stone supporting clamps 362, 363 and 364, all of identical construction, and each having a thumb screw 365 threaded in it for clamping stones 366 in place in the clamps. The underside of each of the slide members 339, 340 and 341 have graduated cam surfaces thereon adapted to ride on cam rollers 367, 368 and 369. Since all of these cams are identical in construction, the one most clearly shown, which is in Fig. 17, will be described in detail and this comprises a sloping surface 370, a flat surface 371, a sloping surface 372 and a flat surface 373. In the operation of the slides, when they are moved to the left by their respective bell crank levers, the sloping surface 370 will first engage the cam roller engaged with that particular slide to elevate the slide against the force exerted by the spring 357. Further advancement of the slide to the left will cause the surface 371 to bear against the cam rollers and move the stones carried by the slides under the surfaces 65, 66 and 67. When the sloping cam surfaces 372 engage the roller of its respective slide, the rollers, which are urged upwardly, as will be described, will force the stone against the surface to be stoned under a predetermined pressure, as will be described more in detail hereinafter. The stone will be reciprocated three times while the flat surfaces 373 of the cams are in engagement with their respective cam rollers, thereby to stone the surfaces 65, 66 and 67 on the sub-assembly being operated upon. The cam rollers 367, 368 and 369 are mounted on the free ends of levers 375, 376 and 377, respectively. These levers are pivotally mounted on the vertically extending plates 303 and 325 and are urged to rotate about pivot pins 378, 379 and 380 by coil springs 381, 382 and 383, which are relatively stronger than the coil springs 356, 357 and 358.

It will be understood that the contour of the cam 153 (Figs. 3 and 15) is such that in its rotation, it will rock the shaft 326 in a counter-clockwise direction (Figs. 16, 17 and 18) far enough to carry the stones 366 under their associated portions of the article being worked upon and will then oscillate the shaft 326 slightly to cause the stones 324 to move back over their corresponding surfaces with which they are in engagement three times and then the shaft 326 will be rocked in a clockwise direction sufficiently to carry similar stones 384 upwardly into engagement with the surfaces 64 and 68 on the sub-assembly being operated upon and to carry a file 385 up against the edge 69 to thus stone the surfaces 64 and 68 and removing the milling burr from the edge 69. The stones 384 are carried in stone supporting clamps 386 and 387 and the file is carried in a file supporting clamp 388. The stone supporting clamps 386 and 387 and the file supporting clamp 388 are mounted on the upper ends of slide members 389, 390 and 391. The slide members 389, 390 and 391 are slidable in slide supports 392, 393 and 394 and are adapted to be actuated by the horizontally extending legs of the bell crank levers 329 and 330. Slide supports 392, 393 and 394 are normally urged to rotate in a clockwise direction about pivot pins 395, 396 and 397 by coil springs 398, 399 and 400, suitable pins being provided for preventing the slide supports from rocking too far in a clockwise direction in a manner similar to that which was provided for the slide supports 343, 344, and 345. The right hand surface of the slide members 389, 390 and 391 have cam surfaces formed thereon which are identical with those formed on the slide member 340 and the operation of these slide members is exactly the same as described in connection with the slide member 340.

From the foregoing, it is believed to be apparent that a sub-assembly carried to the stoning and filing station will be clamped into position in the stoning and filing station by the pneumatically actuated clamps described in detail hereinbefore and that the surfaces 64, 65, 66, 67 and 68 thereof will be stoned at that station and the edge 69 thereof will be filed to remove the milling burr from it. It will also be understood that each time the turn table 101 is indexed, these operations will be carried on at the stoning and filing station on any sub-assembly which has been carried to that station.

Just prior to the next step of indexing the turn table 101, the air under pressure in the cylinder 300 will be released, thereby to release the clamps which were holding the sub-assembly firm at the stoning and filing station, and the turn table 101 will be elevated and indexed to carry the stoned and filed sub-assembly to the next station, where the end of the core 61 will be end-milled to cut it under-flush with the previously stoned faces of the legs 58 and 59 of the pole piece 56.

Core milling station

In this station of the apparatus, the extending end of the magnet core is cut or specifically milled so that it is slightly under-flush with the legs of the pole piece 56 of the sub-assembly being operated upon. In this station, there is equipment quite similar to that provided at the first or leg-milling station for clamping the sub-assembly firmly while an end-mill is moved across the end of the magnet core. Fixed to the main base member at the core-milling station is a bracket 410, on which there is pivotally mounted an air cylinder 411, having an extending piston rod 412, which is forced outwardly from the cylinder in the usual manner, upon the cylinder being supplied with compressed air. The piston rod 412 is pivotally connected, by means of a pin 413, to a bell crank lever 414, which is, in turn, pivoted on a pin 415 mounted in a bracket 416 secured to the underside of the supporting plate 95. The upwardly extending leg of the bell crank lever 414 is pivotally connected to a link 409 by means of a pin 418, and the other end of the link 409 is connected to a yoke 419 and a slide member 417 by means of a pivot pin 420, and upon actuation of the bell crank 414 to move it in a clockwise direction about its pivot 415, the slide member 417, the yoke 419, and the link 409 will be moved to the right to carry the yoke 419 against a lock screw 421, adjustably located in a slide actuator 422. The slide actuator 422 is slidable between plates 423 and 424, suitably fixed to the supporting plate 95. The plate 424 has a dove-tailed groove 425 formed in it, in which the slide member 417 is slidably positioned. Therefore, when the bell crank 414 is rocked in a clockwise direction, it will tend to move the slide actuator 422 to the right and it will also tend to draw a link 426 pivotally connected to the yoke 419 and to a bell crank 427 to the right. This will tend to rock the bell crank 427 about its pivot pin 428 in a counter-clockwise direction. Mounted on the free end of the bell crank 427, by means of a pin 429, is a clamping element 430 having a V-shaped lower surface 431 adapted to engage the base portion 57 of the pole piece 56 and urge the sub-assembly, of which the pole piece forms a part, downwardly where the legs 58 and 59 of the pole piece will bear against two anvils 432 and 433. The anvils 432 and 433 form part of a guide block, designated generally by the numeral 435, which has a portion thereof cut away, as shown at 434, to permit the mounting arm 53 to pass freely through the guide block 435.

It will be noted, by reference to Fig. 1, that the bell crank 427 is made up of two arms which extend down on opposite sides of the plate 423, on which the bell crank 427 is pivoted. The slide actuator 422 has a groove 440 formed across it (Figs. 20 and 21) for receiving the rounded ends 441 and 442 of a pair of bell cranks 443 and 444, respectively, pivoted on pins 445 and 446, respectively. The pins 445 and 446 are mounted on the guide block 435 and the short rounded ends 447 and 448 of the bell cranks 443 and 444 extend through slots 449 and 450 formed in the guide block 435 and into grooves 451 and 452 formed in a pair of clamping elements 453 and 454, which are slidably mounted in the guide block 435 and which have rounded clamping jaws 455 and 456, respectively, adapted to gauge the core 61 of the magnet, as most clearly shown in Fig. 24. The clamping element 453 is shown in perspective in Fig. 23 and since it is of exactly the same construction as the clamping element 454, it is believed that the construction of this detail is thus clearly illustrated.

From the foregoing, it is believed to be apparent that when air under pressure is admitted to the cylinder 411, it will force the piston rod 412 upwardly (Fig. 20) thereby to rock the bell crank 414 about its pivot 415 and tend to draw the slide member 417 to the right (Fig. 20). When the slide member 417 moves to the right, the link 409 will carry the yoke 419 with it and the yoke 419 will apply force to rock the bell crank 427 in a counterclockwise direction about the pivot pin 428 and to move the slide actuator 422 to the right (Fig. 20). In this manner, the pole piece 56 of the electromagnet in the sub-assembly being worked upon will be clamped between the clamping element 430 and the anvils 432 and 433 to prevent vertical movement of the assembly. As the slide actuator 422 is moved to the right (Fig. 20), it will tend to rock the bell cranks 443 and 444 about their pivots, thereby to force the clamping elements 453 and 454 toward each other to grip the core 61 of the sub-assembly being worked upon and prevent any movement of the core in a horizontal plane. When the sub-assembly is thus gripped in position, the extending end of the core 61 may be cut off to the desired size by an end-mill 460, which is driven by a milling spindle 461 fixed in a bracket 462. The milling spindle 461 is adapted to be driven by a belt 463 connected to a motor 464. The motor 464 is mounted on a bracket 465, which, together with the bracket 462, is mounted on a mounting plate 466. The mounting plate 466 is provided with bearings 467 and 468, which pivotally support the plate 466 on a vertically adjustable shaft 469. Surrounding the shaft 469 is a coil spring 470, one end of which is connected to a pin 471, which is fixed into plate 95. The other end of the coil spring is connected to a pin 472 fixed in an arm 473 formed integrally with the bearing 467. The arm 473 carries a cam roller 474, which bears against the cam 151 on the cam sleeve 147. The spring 470 normally tends to rock the shaft 468 in a clockwise direction (Fig. 21) and to hold the cam roller 474 in engagement with the cam 151. The means for adjusting the amount which the end-mill 460 will cut from a core comprises a hand crank 478 journalled in a pair of bearings 479 and 480 and carrying a bevelled gear 481 in mesh with a pivoted gear 482. The pivoted gear 482 is slidably keyed, by means of a key 483, to the lower end of the shaft 469, the gear 482 being held on the main base member 94 by means of a collar 484. The shaft 469 is threaded in a threaded member 485 mounted on the main base member 94 and when the hand crank 478 is turned, the shaft 469 will be rotated in the threaded member 485 and the height of it will be adjusted. A pair of collars 486 and 487 are pinned to the shaft 469 and serve as thrust bearings against which the bearing 467 thrusts. Therefore, when the shaft 469 is raised or lowered, the bearings 467 and 468 will be carried with it to adjust the height of the end mill 460.

After a sub-assembly has had its magnet core end-milled, there will be a slight milling burr formed on the end of the core and the next station of the apparatus is designed to remove this burr from the magnet core. The turn table 101 will, therefore, be indexed after the air is withdrawn from the cylinder 411 to unclamp the sub-assembly, which had been held in the core milling station, and the sub-assembly will be carried around to the next station, where the milling burr will be removed by a chamfering operation.

Chamfering station

The clamping mechanism provided in this station of the machine is an exact duplicate of that provided in the core-milling station and similar reference numerals have been applied to the various parts of the clamping mechanism, which need not be described in detail, it being sufficient to state that the sub-assembly is clamped in place pneumatically by mechanism exactly the same as that provided in the core-milling station, and while the part is held in place in the chamfering station, a chamfering tool 500, mounted on and driven by a suitable chamfer spindle 501, will trim the milling burr from the edges of the core 61. The chamfering tool is shown in cross section in Fig. 27 and comprises angularly disposed teeth 502 and 503 and a pair of face-milling teeth 504. It will be understood that any suitable tool may be provided at this station and that the form shown in Fig. 27 is simply illustrative of a suitable tool for this purpose. The chamfer spindle 501 is driven by means of a belt 505 from a motor 506 and the chamfer spindle 501 and motor 506 are mounted on a slidable plate 507. Formed integrally with the plate 507 are a pair of bearings 508 and 509, which are slidable on a fixed shaft 510. Formed in a projection 511 of the plate 507 is a notch 512 for receiving the rounded end 513 of a bell crank lever 514. The bell crank lever 514 is pivoted, by means of a pin 515, on a plate 516, which is, in turn, mounted on the underside of the supporting plate 95. The vertically extending arm of the bell crank 514 carries a cam roller 517, which bears against the cam 150 on a cam sleeve 147 and which, on rotation of the cam 150, will move the bell crank 514 about the pin 515 to alternately raise and lower the plate 507. A pair of set screws 518 and 519 are provided for adjusting the height of the chamfer driving mechanism with respect to the plate 507, whereby slight adjustments may be made in the height to which the chamfering tool 500 is moved by the cam 150.

After the milling burr has been removed from the edges of the core 61 of the chamfering station, the clamping mechanism at that station will be automatically released and the turn table 101 will be indexed to carry the sub-assembly being worked upon to the final or lacquering station.

Lacquering station

At this station, the parts of the sub-assembly from which the finish has been removed by machining operations have a coat of lacquer applied to them and in this station there is no necessity for holding the sub-assembly in more tightly than the fixture 157 will hold it. Accordingly, when the turn table 101 carries the sub-assembly to the lacquer station, the sub-assembly is loosely held in the fixture 157. Since the stoning operations do not remove the finish except that which is in excess of the amount desired, it is not necessary to apply lacquer to the stone surfaces and the only portions of the sub-assembly to which it is necessary to apply lacquer are the face of the core of the magnet and the leg of the pole piece which was undercut.

The apparatus at the lacquering station is driven by the cam 154 on the cam sleeve 147 and includes a cam roller 550 mounted on the arm of a cam lever 551, which is pivoted on the supporting plate 95 by means of a pivot pin 552. The lever 551 is normally urged to rotate in a counter-clockwise direction about the pivot pin 552 by a coil spring 553 fixed to the lever 551 and to the underside of the supporting plate 95. Mounted on the lever 551 is a plate 554, which supports a lacquer supply tank 556 and a lacquer container 557. The container 557 has its left end (Fig. 30) closed by a plug 558 and has a pair of wick tubes 559 and 560 extending upwardly through its upper surface. Also extending into the container 557 is a pipe 561, which is interconnected with the bottom of the lacquer supply tank 556. The lacquer supply tank 556 has an inverted U-shaped yoke 562 fixed to its lower ends and extending upwardly over the top of it, in which there is threaded a thumb screw 563, which extends into a sleeve 564 formed integrally with a tank cap 565. The sleeve 564 has a pin 567 inserted therein for engagement with a shoulder 568 formed by the juncture of the shank of the screw 563 and a reduced portion 566 of the screw when it is desired to raise the tank cap 565. The tank cap is normally urged downwardly by a compression spring 569 encircling the sleeve 564 and being against the top of the tank cap and the bottom of the bracket 562 to normally maintain the lacquer tank sealed. The lacquer tank 556 is mounted on a threaded member 570 and may be adjusted vertically by a pair of thumb nuts 571 and 572, which are threaded on the member 570 and are disposed on opposite sides of a U-shaped bracket 573 fixed to the plate 554. The pipe 561 being rigidly secured to the tank 556 may be adjusted vertically with the tank, thereby to regulate the height of lacquer 574 in the lacquer container. Since the lacquer tank 556 is sealed by the tank cap 565, the only passage for air to enter the tank 556 is through the pipe 561 and, therefore, as lacquer is removed from the container 557 and the level of the lacquer in the container is thereby lowered, air will be permitted to enter the tank 556 through the pipe 561 to replace lacquer removed from the tank and the level of the lacquer in the container 557 is thus governed by the height of the opening in the lower end of the pipe 561. It will thus be apparent that, since the lacquer tank is adjustable and carries the pipe 561 with it, the height of the lacquer tank 556 in its adjusted positions will govern the height of the supply of lacquer in the container 557. The wick tubes 559 and 560 have a pair of wicks 575 and 576, respectively, positioned in them. The wick 575 will, upon movement of the lever 551, by the cam 154, wipe across the bottom of the core 61 and deposit lacquer from the container 557 on the face of the core. The wick 576 will be moved into engagement with the undercut surface 63 to deposit lacquer on it.

The sub-assembly being worked upon has, at the succeeding stations of the apparatus, had an undercut formed, one of the legs of a pole piece has had the plating burrs stone from it and has had the milling burr formed in the leg milling station removed from it by a filing operation, has had the core cut underflush with the faces of the pole piece legs, has had the milling burr formed in the core-milling station removed from it, and has had the milled surfaces coated with lacquer and in the next indexing motion of the turn table 101, the part will be returned to the loading and unloading station, where it may be removed and a new sub-assembly inserted in the fixture 157. The timing of the various different mechanisms has been described somewhat in detail in connection with the description of the construction thereof. The timing chart shown in Fig. 31 shows clearly the time of operation of the cams which control all of these operations and a complete understanding thereof may be had by reference to said Fig. 31.

While the operations described hereinbefore in connection with the description of each station have been described in connection with one sub-assembly being moved around the table, it will be understood that the turntable 101 may carry six sub-assemblies and that five of them will be having different operations formed upon them at the various stations simultaneously.

Although a specific embodiment of the invention has been described hereinbefore, it will be understood that numerous adaptations thereof may be made without departing from the scope of the appended claims.

What is claimed is:

1. In a machining apparatus for cross bar switch vertical units, means for undercutting a portion of the unit, means for removing excess plating deposits from portions of the unit, means for machining a magnet core forming a part of the unit, means for subsequently recoating the machined surfaces, a reciprocable and indexable table, indexable to carry a unit to operating alignment with the various operating means and reciprocable to carry the unit to operative association with the various operating means, and a common actuating means for the table and for the means for operating on the unit.

2. In a machining apparatus for cross bar switch vertical units, means for milling a flat surface on one of the legs of the pole piece of the unit, means for removing excess plating deposits from the armature pivots of the unit, means for machining the magnet core of the unit to a predetermined dimension with respect to the pole piece of the unit, means for subsequently coating the machined surfaces of the unit, a rotatable and reciprocable table, rotatable to align a vertical unit with the milling, plating-removing, machining and coating means and reciprocable to carry the unit into operative association with each of said operating means, a motor for actuating the table, the milling means, the plating-removing means, the machining means and the coating means, and connections from said motor for operating all of said means operated thereby in timed relation one to another.

3. In an apparatus for machining articles, means for milling an undercut on a portion of an article, means for milling another portion of the article to a predetermined dimension, means for removing the milling burr at the undercut, means for removing the milling burr from the second mentioned portion of the article, means for coating the milled surface with a coating material comprising an oscillatable tank of coating material, a container movable with the tank, coating applying means for transferring coating material from the container to the milled surfaces upon movement of the tank and container, a table movable in planes right angles one to another and carrying an article into association with each of the aforementioned means, and a common actuator for the table and the oscillatable tank.

4. In an apparatus for machining articles, bodily movable means for milling an undercut on a portion of an article including a cutter and means for driving it, bodily movable means for milling another portion of the article to a predetermined dimension including a cutter and means for driving it, means for removing the milling burr at the undercut, means for removing the milling burr from the second mentioned portion of the article, means for coating the milled surface with a coating material comprising an oscillatable tank of coating material, a container movable with the tank, coating applying means including a pair of wicks extending into the coating material in the container and one of said wicks being movable in a wiping movement across one of the milled surfaces and the other wick being movable under pressure into engagement with the other milled surface upon movement of the container, an article carrying means for carrying articles into association with the milling means, the burr-removing means and the coating means, and a common actuator for the article carrying means, both of the milling means, both of the burr-removing means and the coating means, said common actuator imparting bodily movement to the two milling means and the coating means.

5. In a machining apparatus for cross bar switch vertical units, means for milling a flat surface on one of the legs of the pole piece of the unit, means for removing excess plating deposits from armature pivots of the unit, means for machining the magnet core of the unit to a predetermined dimension with respect to the pole pieces of the unit, means for subsequently coating the machined surfaces of the unit, motor means individual to the milling means and machining means, said motor means and its milling means being movable bodily as a unit and said machining means and its motor means being bodily movable as a unit, a main cam shaft having cams thereon for moving the milling means and machining means and their respective motors bodily to engage the milling and machining means with the switch unit, and a motor means for driving said cam shaft.

6. In an apparatus for machining articles, means for milling an undercut on a portion of the article, means for supporting said means for milling an undercut for movement bodily, means for milling another portion of the article to a predetermined dimension, means for supporting the second-mentioned milling means for movement bodily, means for removing the milling burr at the undercut, means for removing the milling burr from the second-mentioned portion of the article, means for coating the milled surfaces with a coating material comprising an oscillatable tank of coating material, a container movable with the tank, coating applying means for transferring coating material from the container to the milled surface upon movement of the tank and container, separate motors individual to the milling means, means for supporting said separate motors for movement with their respective milling means, and a common drive means for bodily moving the milling means and their motors and for actuating the burr-removing means, tank and container.

GEORGE STUHLFAUTH.